(12) United States Patent
Naito et al.

(10) Patent No.: US 11,296,348 B2
(45) Date of Patent: Apr. 5, 2022

(54) FUEL CELL STACK

(71) Applicant: HONDA MOTOR CO., LTD., Tokyo (JP)

(72) Inventors: Hideharu Naito, Wako (JP); Masahiro Sato, Wako (JP); Manabu Mitani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 9 days.

(21) Appl. No.: 16/819,230

(22) Filed: Mar. 16, 2020

(65) Prior Publication Data

US 2020/0303760 A1    Sep. 24, 2020

(30) Foreign Application Priority Data

Mar. 18, 2019 (JP) .............................. JP2019-049706

(51) Int. Cl.
| | |
|---|---|
| *H01M 8/2475* | (2016.01) |
| *H01M 8/04089* | (2016.01) |
| *H01M 8/2483* | (2016.01) |
| *B60L 50/72* | (2019.01) |
| *H01M 8/04791* | (2016.01) |

(52) U.S. Cl.
CPC .......... *H01M 8/2475* (2013.01); *B60L 50/72* (2019.02); *H01M 8/04089* (2013.01); *H01M 8/04805* (2013.01); *H01M 8/2483* (2016.02); *H01M 2250/20* (2013.01)

(58) Field of Classification Search
CPC .............. B60L 50/72; H01M 2250/20; H01M 8/04089; H01M 8/04805; H01M 8/2475; H01M 8/2483; H01M 8/2484; Y02E 60/50; Y02T 90/40
See application file for complete search history.

(56) References Cited

U.S. PATENT DOCUMENTS

2015/0270562 A1    9/2015    Naito et al.
2017/0057339 A1*   3/2017    Nakagawa .............. H01M 8/24

FOREIGN PATENT DOCUMENTS

| JP | 2013206855 A | * 10/2013 |
|---|---|---|
| JP | 2015-193370 | 11/2015 |

OTHER PUBLICATIONS

Yoshinaga et al., Fuel Cell System, Oct. 7, 2013, Espacenet machine translation (Year: 2013).*

* cited by examiner

*Primary Examiner* — Adam A Arciero
(74) *Attorney, Agent, or Firm* — Amin, Turocy & Watson, LLP

(57) ABSTRACT

A fuel cell stack includes a stack body including a plurality of power generation cells stacked together, a stack case storing the stack body, and an auxiliary device case storing a fuel cell auxiliary device. Two exhaust gas openings are provided in an upper part of the stack case. One exhaust gas opening is provided in an upper part of the auxiliary device case. An exhaust duct is connected to the only three exhaust gas openings in total.

8 Claims, 6 Drawing Sheets

FUEL CELL STACK

CROSS-REFERENCE TO RELATED APPLICATION

This application is based upon and claims the benefit of priority from Japanese Patent Application No. 2019-049706 filed on Mar. 18, 2019, the contents of which are incorporated herein by reference.

BACKGROUND OF THE INVENTION

Field of the Invention

The present invention relates to a fuel cell stack.

Description of the Related Art

For example, a solid polymer electrolyte fuel cell includes a membrane electrode assembly (MEA) formed by providing an anode on one surface of an electrolyte membrane, and a cathode on the other surface of the electrolyte membrane. The electrolyte membrane is a polymer ion exchange membrane. A power generation cell is formed by sandwiching the membrane electrode assembly between separators. In the fuel cell of this type, a plurality of the power generation cells are stacked together to form an in-vehicle fuel cell stack mounted in a fuel cell vehicle.

In the fuel cell vehicle, in particular, hydrogen as a fuel gas may leak into space where the fuel cell stack is mounted. Therefore, with a view to discharge the hydrogen to the outside efficiently in the event that leakage of hydrogen from the fuel cell stack occurs, for example, a fuel cell vehicle disclosed in Japanese Laid-Open Patent Publication No. 2015-193370 has been proposed. Japanese Laid-Open Patent Publication No. 2015-193370 adopts structure where an exhaust duct (ventilation duct) is connected to a stack case containing a fuel cell stack, and hydrogen is discharged to the outside of the vehicle from the inside of the stack case through the exhaust duct.

SUMMARY OF THE INVENTION

In Japanese Laid-Open Patent Publication No. 2015-193370, the exhaust duct is connected to the stack case. However, in the case of adopting structure where an auxiliary device case storing, e.g., hydrogen system auxiliary devices (injector, etc.) is positioned adjacent to, and joined to the stack case, exhaust structure including the exhaust duct may be complicated undesirably.

The present invention has been made taking such a problem into consideration, and an object of the present invention is to simplify exhaust structure in a fuel cell stack where an auxiliary device case is disposed adjacent to a stack case.

According to an aspect of the present invention, a fuel cell stack mounted in a vehicle is provided. The fuel cell stack includes a stack body including a plurality of power generation cells stacked together, a stack case configured to store the stack body, and an auxiliary device case adjacent to, and joined to the stack case in a horizontal direction, the auxiliary device case being configured to store a fuel cell auxiliary device, a tightening load being applied to the stack body by one of end plates disposed at one end of the stack case and another of end plates disposed at another end of the stack case, wherein two exhaust gas openings are provided in an upper part of the stack case, one exhaust gas opening is provided in an upper part of the auxiliary device case, and an exhaust duct is connected to the only three exhaust gas openings in total.

In the present invention, it becomes possible to simplify exhaust structure in a fuel cell stack where an auxiliary device is disposed adjacent to a stack case.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
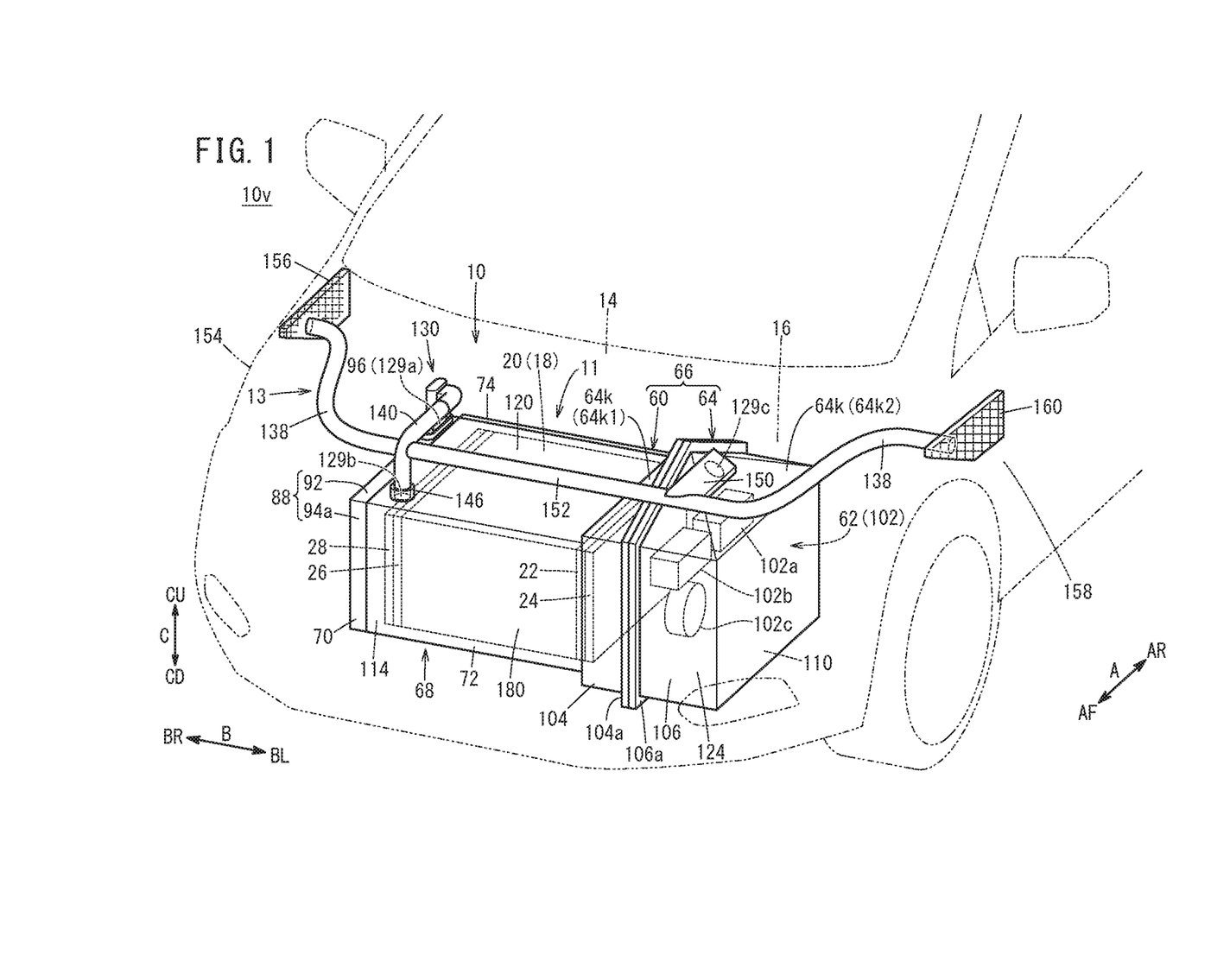
FIG. 1 is a perspective view showing a fuel cell vehicle equipped with a fuel cell stack according to an embodiment of the present invention.

As shown in FIG. 1, an embodiment of the present invention will be described assuming that, as an example, a fuel cell system 10 is mounted in a fuel cell vehicle 10v which is a fuel cell electric automobile. However, the present invention is not limited specially in this respect. In use, the fuel cell system 10 may be mounted in various mounting targets (not shown). Hereinafter, unless specially noted, a front/rear direction (indicated by an arrow A), a left/right direction (indicated by an arrow B), and an upper/lower direction (indicated by an arrow C) mentioned in the following description are based on a direction viewed from a passenger (not shown) seated on the driver's seat of the fuel cell vehicle 10v.

The fuel cell system 10 is provided in a front room (motor room) 16 formed on the front side (indicated by an arrow AF) of a dashboard 14 of the fuel cell vehicle 10v. Further, the fuel cell system 10 includes a fuel cell stack 11, and an exhaust duct 13 connected to the fuel cell stack 11. The fuel cell stack 11 includes a stack body 20 formed by stacking a plurality of power generation cells 18 (see FIG. 2) together in the left/right direction (indicated by the arrow B). At one end of the stack body 20 in a stacking direction (left end, end in a direction indicated by an arrow BL), a first terminal plate 22 is provided. A first insulating plate 24 is provided outside the first terminal plate 22. At the other end of the stack body 20 in the stacking direction (right end, end in a direction indicated by an arrow BR), a second terminal plate 26 is provided. A second insulating plate 28 (insulating plate) is provided outside the second terminal plate 26.

Figure 2:
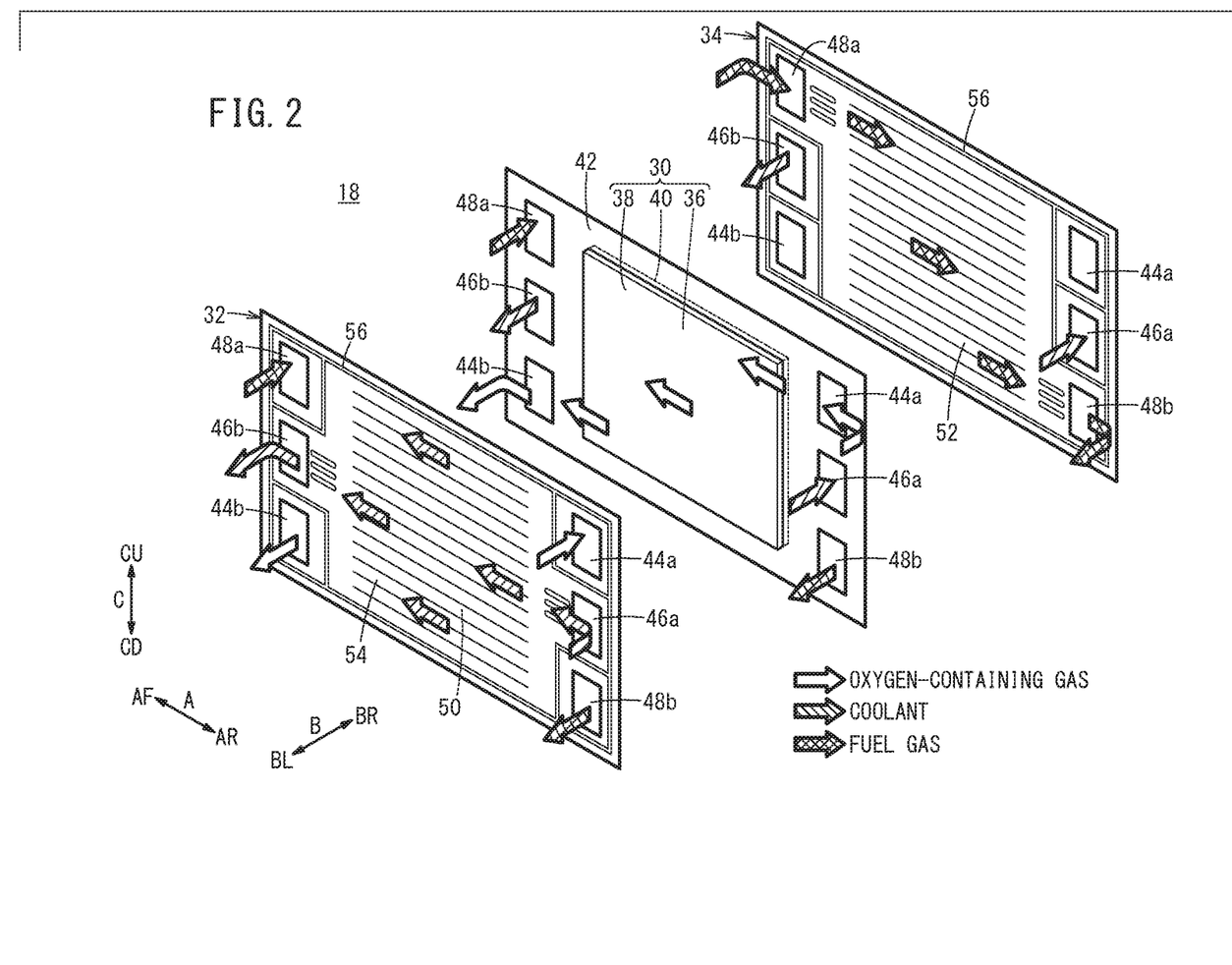
FIG. 2 is an exploded perspective view showing a power generation cell.

As shown in FIG. 2, a power generation cell 18 includes a membrane electrode assembly 30, and a first separator 32 and a second separator 34 sandwiching the membrane electrode assembly 30. The membrane electrode assembly 30 includes an electrolyte membrane 36, and a cathode 38 and an anode 40 provided on both sides of the electrolyte membrane 36. A film shaped resin frame member 42 is provided over the entire periphery of an outer peripheral portion of the membrane electrode assembly 30. The first separator 32 and the second separator 34 are metal separators or carbon separators.

At one end (end in a direction indicated by an arrow AR) of the rectangular power generation cell 18 in a longitudinal direction (indicates by the arrow A), an oxygen-containing gas supply passage 44a, a coolant supply passage 46a, and a fuel gas discharge passage 48b are arranged in a vertical direction (indicated by the arrow C). The oxygen-containing gas supply passage 44a, the coolant supply passage 46a, and the fuel gas discharge passage 48b extend through the power generation cell 18 in the stacking direction (indicated by the arrow B). An oxygen-containing gas is supplied to the oxygen-containing gas supply passage 44a. A coolant is supplied to the coolant supply passage 46a. A fuel gas such as a hydrogen-containing gas is discharged from the fuel gas discharge passage 48b.

At the other end (end indicated by an arrow AF) of the power generation cell 18 in the longitudinal direction, a fuel gas supply passage 48a for supplying the fuel gas, a coolant discharge passage 46b for discharging the coolant, and an oxygen-containing gas discharge passage 44b for discharging the oxygen-containing gas are arranged in the vertical direction. The fuel gas supply passage 48a, the coolant discharge passage 46b, and the oxygen-containing gas discharge passage 44b extend through the power generation cell 18 in the stacking direction.

The first separator 32 has an oxygen-containing gas flow field 50 on its surface facing the membrane electrode assembly 30. The oxygen-containing gas flow field 50 is connected to the oxygen-containing gas supply passage 44a and the oxygen-containing gas discharge passage 44b. The second separator 34 has a fuel gas flow field 52 on its surface facing the membrane electrode assembly 30. The fuel gas flow field 52 is connected to the fuel gas supply passage 48a and the fuel gas discharge passage 48b.

A coolant flow field 54 is formed between the first separator 32 of one of the power generation cells 18 that are adjacent to each other and the second separator 34 of the other of the adjacent power generation cells 18. The coolant flow field 54 is connected to the coolant supply passage 46a and the coolant discharge passage 46b. Seal members 56 are provided separately from, or integrally with the first separator 32 and the second separator 34, respectively. The seal members 56 contact the resin frame member 42, respectively. The first separator 32 and the second separator 34 may be provided with, instead of the seal members 56, bead seals (not shown) protruding toward the resin frame member 42 by press forming.

As shown in FIG. 1, the fuel cell stack 11 includes a case unit 66 made up of a stack case 60 storing the stack body 20, and an auxiliary device case 64 storing a fuel cell auxiliary device 62. The case unit 66 has a rectangular shape in a plan view, and the long sides of the case unit 66 extend in the vehicle width direction (stacking direction of the stack body 20 indicated by the arrow B).

Figure 3:
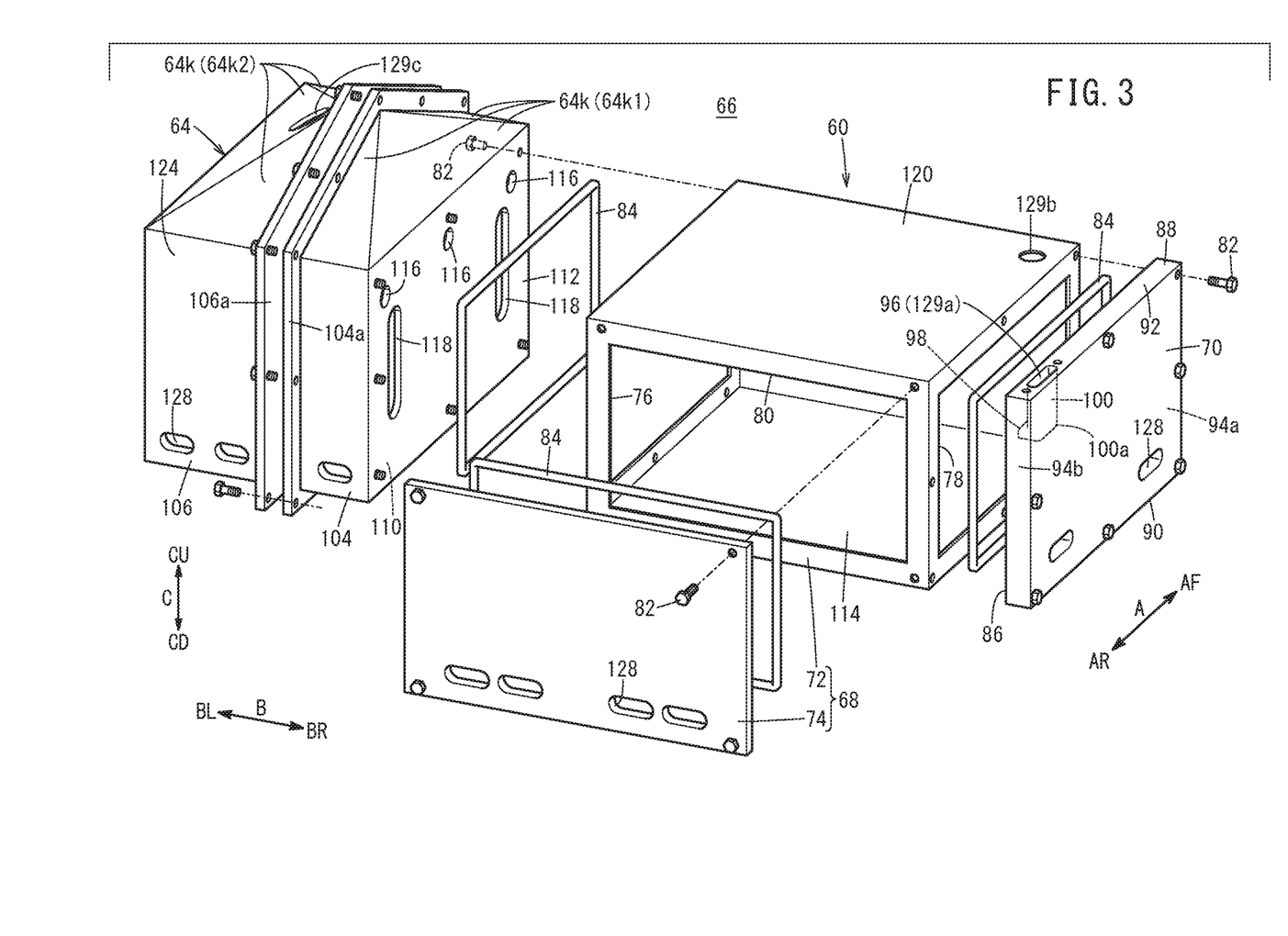
FIG. 3 is an exploded perspective view showing a case unit of a fuel cell stack.

As shown in FIG. 3, the stack case 60 is formed to include a peripheral wall case 68 covering the outer peripheral surface of the stack body 20 (see FIG. 1), and an end plate 70 provided at a right end of the stack body 20 in the stacking direction (end indicated by the arrow BR). The peripheral wall case 68 includes a case body 72 having a rectangular shape in a plan view, and a rear panel 74. The case body 72 has a rectangular left opening 76 formed on the left side (in the direction indicated by the arrow BL), a rectangular right opening 78 formed on the right side (in the direction indicated by the arrow BR), and a rectangular rear opening 80 formed on the rear side (in a direction indicated by the arrow AR). The case body 72 has a box shape.

The rear panel 74 is joined to the case body 72 using bolts 82 in a manner to close the rear opening 80. A seal member 84 made of elastic material is interposed between the case body 72 and the rear panel 74, along the outer periphery of the rear opening 80. It should be noted that the rear panel 74 and the case body 72 may not be separate component parts. The rear panel 74 may be integral with the case body 72.

The end plate 70 is joined to the case body 72 using bolts 82 in a manner to close the right opening 78. In the structure, the end plate 70 is provided adjacent to one end (right end, an end indicated by the arrow BR) of the stack body 20 (see FIG. 1) provided in the case body 72, in the stacking direction. The seal member 84 is interposed between the case body 72 and the end plate 70, along the outer periphery of the right opening 78. The end plate 70 has a rectangular plate having the longitudinal direction oriented in the front/rear direction (indicated by the arrow A).

Figure 4:
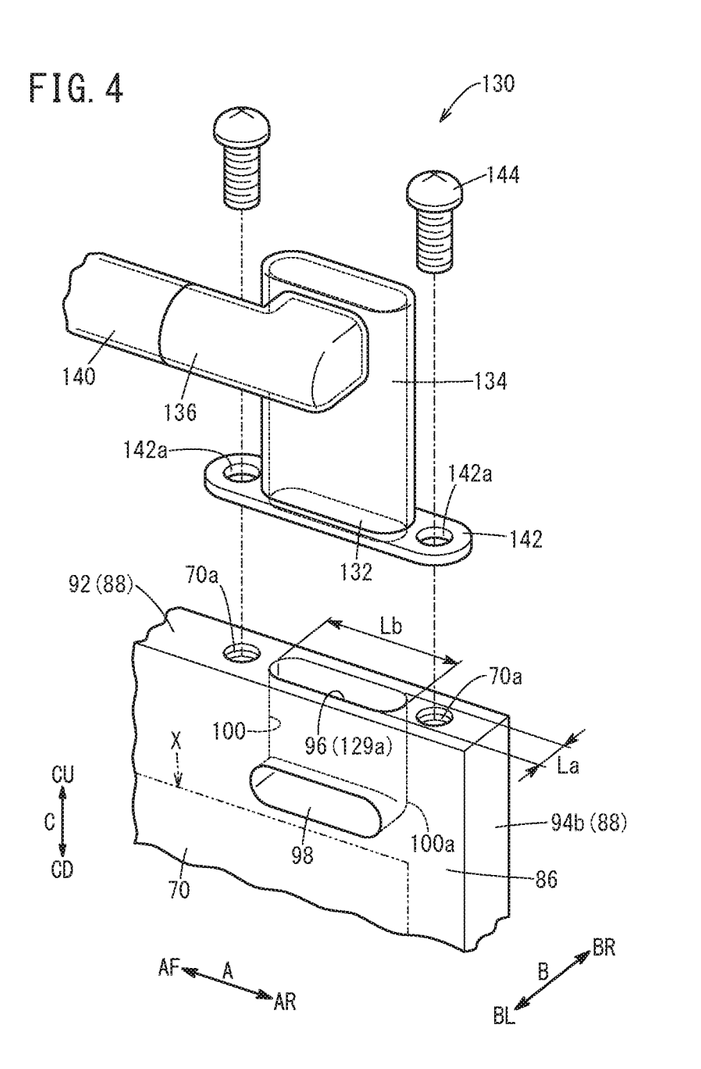
FIG. 4 is an exploded perspective view showing main components of an end plate and a plate connection member.

As shown in FIG. 4, the end plate 70 has an inner main surface 86 provided at one end (left end, an end indicated by the arrow BL) of the end plate 70 in the thickness direction (indicated by an arrow B), adjacent to the inside of the stack case 60 (case body 72, see FIG. 3). The second insulating plate 28 provided at the right end of the stack body 20 (see FIG. 1) is positioned adjacent to the inside of an area X indicated by a two-dot chain line in FIG. 4, of the inner main surface 86, through the right opening 78 of the case body 72 (see FIG. 3). That is, the outer marginal portion of the area X corresponds to the outer peripheral end of the second insulating plate 28.

Further, as shown in FIG. 3, an outer peripheral end surface 88 of the end plate 70 includes a bottom surface 90, an upper surface 92, and side surfaces 94a, 94b. As shown in FIGS. 3 and 4, at one end of the end plate 70 in the longitudinal direction (rear end indicated by an arrow AR), a first opening 96 opened in the upper surface 92, a second opening 98 opened in the upper part of the inner main surface 86, and a connection channel 100 extending inside the end plate 70 to connect the first opening 96 and the second opening 98, are provided. The first opening 96 is an exhaust gas opening 129a (hereinafter also referred to as a "first exhaust gas opening 129a"), for discharging the fuel gas from the stack case 60 in the case where the fuel gas leaked out of the stack body 20. As shown in FIG. 4, the second opening 98 is provided in the longitudinal direction (indicated by the arrow A) of the end plate 70, outside the area X of the inner main surface 86. Further, the connection channel 100 includes a curved portion 100a, and has an L-shape in a view viewed in the direction indicated by the arrow A.

In the first opening 96, the length Lb of the first opening 96 in the peripheral direction of the end plate 70 is larger than the length La of the first opening 96 in the thickness direction (indicated by an arrow B) of the end plate 70. Further, both ends of the first opening 96 in the peripheral direction of the end plate 70 have a circular arc shape.

As shown in FIG. 3, in the case unit 66, an upper wall 120 of the peripheral wall case 68 has an exhaust gas opening 129b (hereinafter also referred to as a "second exhaust gas opening 129b"), for discharging the fuel gas from the stack case 60 in the case where the fuel gas leaked out of the stack body 20. In the case unit 66, the second exhaust gas opening 129b is provided in a portion of the end plate 70 close to the other end opposite to the first opening 96 in the longitudinal direction, i.e., a portion on the right end side (indicated by the arrow BR) of the front end side (indicated by the arrow AF) of the upper wall 120. The second exhaust gas opening 129*b* penetrates through the stack case 60 in a manner to connect the inside and the outside of an inner space of the stack case 60 (hereinafter referred to as a "stack body storage space 114").

As shown in FIG. 1, the auxiliary device case 64 is a protection case for protecting the fuel cell auxiliary device 62 stored inside the auxiliary device case 64. As the fuel cell auxiliary device 62, a hydrogen system auxiliary device (fuel gas supply device) 102 is stored in the auxiliary device case 64. The hydrogen system auxiliary device 102 includes an injector 102*a*, an ejector 102*b*, a fuel gas pump 102*c*, and valves (not shown).

Specifically, as shown in FIG. 3, the auxiliary device case 64 includes a first case member 104 and a second case member 106 each having a box shape. One end of each of the first case member 104 and the second case member 106 is opened, and flanges 104*a*, 106*a* are provided around openings of the first case member 104 and the second case member 106. The first case member 104 and the second case member 106 are joined together by fixing the flanges 104*a*, 106*a* of the first and second case members 104, 106 together using bolts. An internal space of the auxiliary device case 64 which stores the fuel cell auxiliary devices 62 (see FIG. 1) (hereinafter referred to as an "auxiliary device storage space 110") is formed between the first case member 104 and the second case member 106 that are joined together as described above.

A partition wall 112 for closing the left opening 76 is provided at the right end (end indicated by the arrow BR) of the first case member 104, and the partition wall 112 is joined to a left end (end indicated by the arrow BL) of the case body 72 using bolts 82. The seal member 84 made of elastic material is interposed between the partition wall 112 and the case body 72, along the outer periphery of the left opening 76. The partition wall 112 of the auxiliary device case 64 also has a function of the end plate of the stack case 60. As a result, in the case unit 66, the stack body storage space 114 storing the stack body 20 (see FIG. 1) is formed on the right side of the partition wall 112, and the auxiliary device storage space 110 is formed on the left side of the partition wall 112. That is, the stack case 60 is formed by the partition wall 112 adjacent to the left end of the stack body 20, the peripheral wall case 68 adjacent to the outer peripheral surface of the stack body 20, and the end plate 70 adjacent to the right end of the stack body 20. The stack body storage space 114 is formed inside the stack case 60. It should be noted that the structure where the partition wall 112 provided integrally with the first case member 104 also serves as the end plate may not be adopted. Alternatively, the end plate may be joined to the left end of the peripheral wall case 68, and the first case member 104 which does not have the partition wall 112 may be joined to the end plate.

A plurality of connection holes 116 connecting the stack body storage space 114 and the auxiliary device storage space 110 are provided in an upper part of the partition wall 112, and the seal member 84 is provided outside the connection holes 116. Further, the partition wall 112 has two laterally elongated piping openings 118 for inserting connection pipes (not shown) into the piping openings 118, and these connection pipes are connected to the oxygen-containing gas supply passage 44*a*, the oxygen-containing gas discharge passage 44*b*, the fuel gas supply passage 48*a*, the fuel gas discharge passage 48*b*, the coolant supply passage 46*a* and the coolant discharge passage 46*b* (see FIG. 2) provided in the stack body 20, respectively.

An exhaust gas opening 129*c* (hereinafter also referred to as a "third exhaust gas opening 129*c*") is provided in the upper part of the second case member 106 of the auxiliary device case 64 for discharging the fuel gas from the auxiliary device case 64, in the case where the fuel gas leaked out of the stack body 20 or the fuel cell auxiliary device 62. The third exhaust gas opening 129*c* penetrates through the second case member 106 in a manner to connect the inside and the outside of the auxiliary device storage space 110.

Figure 5:
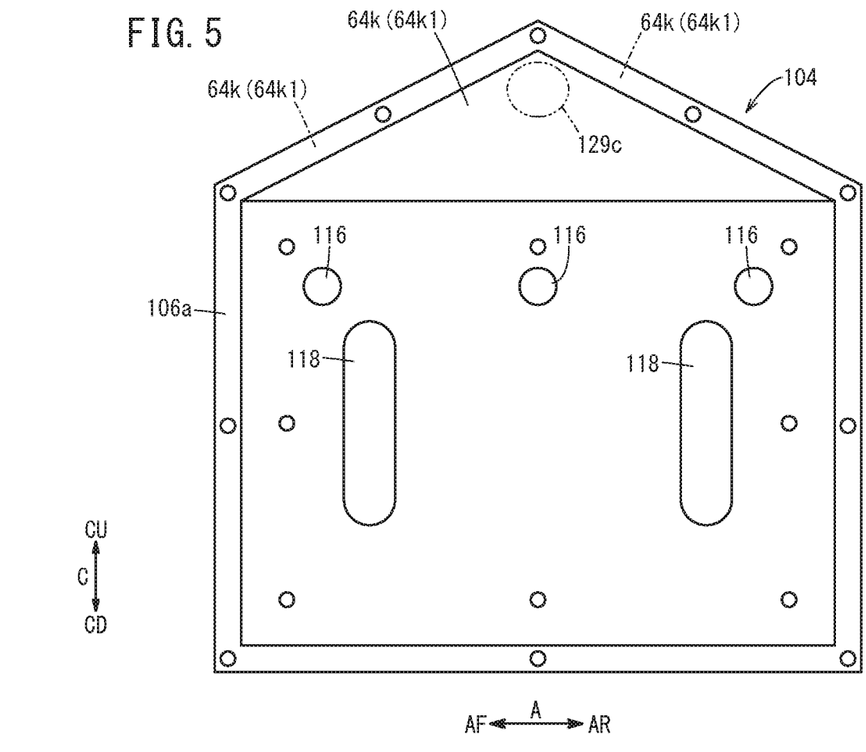
FIG. 5 is a front view showing a first case member.

The third exhaust gas opening 129*c* is provided in the upper part of an inclined portion 64*k* forming the upper surface of the auxiliary device case 64. Specifically, the upper part of the auxiliary device case 64 includes a plurality of (three, in the embodiment of the present invention) inclined portions 64*k* forming an upward ridge shape, and the exhaust gas opening 129*c* is provided at the peak where the plurality of inclined portions 64*k* are concentrated. The upper part of the auxiliary device case 64 (the upper part of the first case member 104 and the upper part of the second case member 106) has an inversely V-shape (triangular roof shape) not only as viewed in the stacking direction of the stack body 20 (indicated by the arrow B) (horizontal direction), but also as viewed in the vehicle front/rear direction (indicated by the arrow A) (see also FIGS. 5 and 6).

Figure 6:
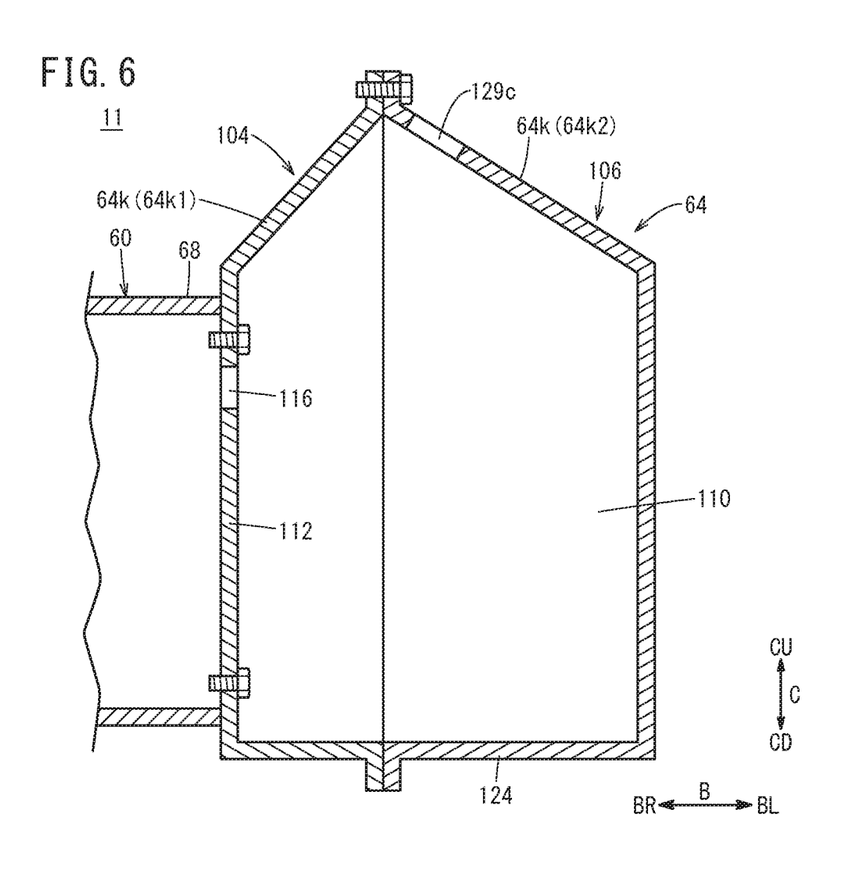
FIG. 6 is a cross sectional view showing an auxiliary device case.

As shown in FIG. 6, the plurality of inclined portions 64*k*1 forming the upper surface (upper portion) of the first case member 104 are inclined such that the inclined portions 64*k*1 get higher in the vertical direction, toward the second case member 106. The plurality of inclined portions 64*k*2 forming the upper surface (upper part) of the second case member 106 are inclined such that the inclined portions 64*k*2 get higher in the vertical direction, toward the first case member 104. In the second case member 106, the third exhaust gas opening 129*c* is opened obliquely upward opposite to the partition wall 112 which also serves the end plate (opposite to the stack body 20). That is, the third exhaust gas opening 129*c* is opened obliquely upward, from the stack case 60 toward the auxiliary device case 64.

As shown in FIG. 3, in the case unit 66, it is possible to supply the air to the inside (the stack body storage space 114 and the auxiliary device storage space 110) of the case unit 66, through ventilation holes 128 penetrating through the lower part of the end plate 70, the lower part of the rear panel 74, and the lower part of a side wall 124 of the auxiliary device case 64. In FIG. 1, the ventilation holes 128 are not shown.

As shown in FIG. 4, a plate connection member 130 of the exhaust duct 13 is connected to the first exhaust gas opening 129*a* provided in the upper surface 92 of the end plate 70. For example, the plate connection member 130 is a hollow member, e.g., made of metal. The plate connection member 130 includes an opening side end 132 (lower end) (first connection end) as an end on the side connected to the first opening 96, a first extension part 134 extending upward from the opening side end 132, and a second extension part 136 connected to the left end (end indicated by the arrow BL) on the upper side (indicated by an arrow CU) of the first extension part 134 and extending toward the front side (indicated by an arrow AF). That is, the second extension part 136 is provided inward of the first extension part 134 (indicated by the arrow BL) in the stacking direction. The front end of the second extension part 136 is coupled to the rear end of a first pipe 140 (connection pipe).

A flange 142 is provided at the opening side end 132 which covers the first opening 96, and the flange 142 and the end plate 70 are fixed together using fastening members 144 such as bolts, at positions adjacent to both ends of the first opening 96 in the longitudinal direction. The fastening members 144 are inserted into insertion holes 142a formed in the flange 142, and screwed into screw holes 70a formed at an upper end of the end plate 70. It should be noted that a plate shaped elastic seal (not shown) is interposed between the flange 142 and the outer peripheral end surface 88 (upper surface 92).

In the structure, the plate connection member 130 is connected to the first exhaust gas opening 129a. In this regard, both ends in the stacking direction (indicated by the arrow B) of, at least the opening side end 132, the flange 142, and the first extension part 134 of the plate connection member 130 are provided within the range of the thickness of the end plate 70. That is, in the embodiment of the present invention, each of the opening side end 132, the flange 142, and the first extension part 134 of the plate connection member 130 has a flat shape where the length in the front/rear direction (peripheral direction of the outer peripheral end surface 88 indicated by the arrow A) is larger than the length in the left/right direction (stacking direction indicated by the arrow B).

As shown in FIG. 1, a second connection end of the exhaust duct 13 is connected to the second exhaust gas opening 129b provided in the upper wall 120 of the peripheral wall case 68. The front end of the first pipe 140 is connected to the upper end of a peripheral wall connection member 146. A third connection end of the exhaust duct 13 is connected to the third exhaust gas opening 129c provided in the upper part of the second case member 106.

The exhaust duct 13 includes the first pipe 140 connected to the first exhaust gas opening 129a and the second exhaust gas opening 129b, a second pipe 150 connected to the third exhaust gas opening 129c, and a coupling pipe 152 connecting the first pipe 140 and the second pipe 150 together. The inside of the stack case 60 and the inside of the auxiliary device case 64 are connected to the exhaust pipe 13 extending in the vehicle width direction (indicated by the arrow B) through the first pipe 140, the second pipe 150, and the coupling pipe 152.

The first pipe 140 is connected to the first exhaust gas opening 129a provided in the stack case 60 through the plate connection member 130. The first pipe 140 extends through the left side (inside in the stacking direction) of the right end (end indicated by the arrow BR) of the stack case 60, between the peripheral wall connection member 146 and the plate connection member 130. The second pipe 150 extends through the right side (inside in the stacking direction) of the left end (end in the direction indicated by the arrow BL) of the auxiliary device case 64. The second pipe 150 has a flat shape in cross section where the thickness in the upper/lower direction is smaller than the width in the horizontal direction. The thickness of the second pipe 150 in the upper/lower direction is smaller than the thickness (outer diameter) of the first pipe 140 in the upper/lower direction. The front ends of the first pipe 140 and the second pipe 150 are connected to the coupling pipe 152.

Further, the exhaust duct 13 includes two outlet ducts 138. One end (right end) of the coupling pipe 152 in the direction in which the coupling pipe 152 extends is coupled to one of the outlet ducts 138 thorough the first pipe 140. The outlet duct 138 is connected to a right exhaust gas port 156 provided in a right fender 154 of the fuel cell vehicle 10v. The other end (left end) of the coupling pipe 152 in the direction in which the coupling pipe 152 extends is coupled to the other of the outlet ducts 138 through the second pipe 150. The exhaust duct 13 is connected to a left exhaust gas port 160 provided in a left fender 158 of the fuel cell vehicle 10v. That is, the exhaust duct 13 is connected to the outside of the fuel cell vehicle 10v through the right exhaust gas port 156 and the left exhaust gas port 160.

Operation of the fuel cell vehicle 10v including the fuel cell system 10 having the structure as described above will be described.

During operation of the fuel cell vehicle 10v (FIG. 1), the fuel gas is supplied to the fuel gas supply passage 48a (FIG. 2) of the fuel cell system 10, the oxygen-containing gas is supplied to the oxygen-containing gas supply passage 44a (FIG. 2), and the coolant is supplied to the coolant supply passage 46a (FIG. 2). As shown in FIG. 2, the fuel gas supplied to the fuel gas supply passage 48a flows into the fuel gas flow field 52 of the second separator 34, and the fuel gas flows along the anode 40. The oxygen-containing gas supplied to the oxygen-containing gas supply passage 44a flows into the oxygen-containing gas flow field 50 of the first separator 32, and the oxygen-containing gas flows along the cathode 38.

Thus, in the membrane electrode assembly 30, the fuel gas supplied to the anode 40 and the oxygen-containing gas supplied to the cathode 38 are partially consumed in electrochemical reactions in the electrode catalyst layers to perform power generation. The remaining fuel gas which has not been consumed in the electrochemical reactions is discharged from the fuel gas discharge passage 48b, and the remaining oxygen-containing gas is discharged from the oxygen-containing gas discharge passage 44b.

In the meanwhile, the coolant supplied to the coolant supply passage 46a flows through the coolant flow field 54 to cool the membrane electrode assembly 30. Thereafter, the coolant is discharged from the coolant discharge passage 46b.

As shown in FIG. 1, in the case where the fuel gas leaked out of the stack body 20 into the stack case 60 (stack body storage space 114), as shown in FIG. 4, the leaked fuel gas can flows into the first pipe 140 of the exhaust duct 13 through the second opening 98, the connection channel 100, the first opening 96 (first exhaust gas opening 129a), and the plate connection member 130. Further, as shown in FIG. 1, the leaked fuel gas in the stack case 60 can also flow into the first pipe 140 through the second exhaust gas opening 129b and the peripheral wall connection member 146.

Further, the leaked fuel gas which flowed into the auxiliary device storage space 110 from the stack body storage space 114 through the connection holes 116, and the fuel gas which leaked out of the hydrogen system auxiliary device 102 into the auxiliary device storage space 110 can flow into the second pipe 150 of the exhaust duct 13 through the auxiliary device case 64. The leaked fuel gas which flowed into the first pipe 140 and the second pipe 150 is guided into at least one of the right exhaust gas port 156 and the left exhaust gas port 160 through the coupling pipe 152 and the outlet ducts 138, and discharged to the outside of the vehicle.

In the embodiment of the present invention, the following advantages are obtained.

In the fuel cell stack 11, the two exhaust gas openings 129a, 129b are provided in the upper part of the stack case 60, and the one exhaust gas opening 129c is provided in the upper part of the auxiliary device case 64. The exhaust duct 13 is connected to the two exhaust gas openings 129a, 129b and the one exhaust gas opening 129c. As described above, the number of the exhaust gas openings provided in the fuel cell system 10 is only three. Therefore, it becomes possible to simplify the exhaust structure provided for the fuel cell system 10, and reduce the number of assembling steps and the number of component parts.

The one exhaust gas opening 129c is provided in the upper part of the inclined portion 64k forming the upper surface of the auxiliary device case 64. In the structure, even in the case where the fuel cell vehicle 10v is inclined from the horizontal direction within a predetermined angular range, since the one exhaust gas opening 129c provided in the auxiliary device case 64 is positioned at the uppermost position of the auxiliary device case 64, natural discharging of the exhaust gas can be performed effectively.

The plurality of inclined portions 64k forming the upwardly oriented ridge shape are provided in the upper part of the auxiliary device case 64, and the exhaust gas opening 129c is provided at the peak where the plurality of the inclined portions 64k are concentrated. In the structure, even in the case where the fuel cell vehicle 10v is tilt front/rearward or left/rightward within the predetermined angular range, since the one exhaust gas opening 129c provided in the auxiliary device case 64 is positioned at the uppermost position of the auxiliary device case 64, natural discharging of the exhaust gas can be performed effectively.

The two exhaust gas openings 129a, 129b are provided in the portion of the stack case 60 close to the end plate 70. In the structure, even in the case where the fuel cell vehicle 10v is tilt from the horizontal direction in a manner that the portion of the stack case 60 close to the end plate 70 gets higher relatively, natural discharging of the exhaust gas can be performed effectively through the two exhaust gas openings 129a, 129b.

The partition wall 112 which also serves as the end plate has the connection holes 116 connecting the internal space of the stack case 60 and the internal space of the auxiliary device case 64. In the structure, even if the fuel cell vehicle 10v is tilt, the leaked fuel gas flows from the internal space of the stack case 60 through the connection holes 116 into the internal space of the auxiliary device case 64, and it is possible to suitably guide the leaked fuel gas in the auxiliary device case 64 and the stack case 60 into the exhaust duct 13.

The exhaust gas opening 129c is opened obliquely upward opposite to the partition wall 112 (end plate). In the structure, since it is possible to reduce the height of the exhaust duct 13 connected to the exhaust gas opening 129c, it becomes possible to reduce the hood height of the fuel cell vehicle 10v. Accordingly, it is possible to improve the freedom in the design of the fuel cell vehicle 10v.

In the fuel cell system 10, a plate connection member 130 is connected to first opening 96 provided in the upper surface 92 of the end plate 70, and the plate connection member 130 connects the inside of the stack case 60 (stack body storage space 114) to the exhaust duct 13. Therefore, for example, unlike the case where the first opening 96 is provided on the back surface of the inner main surface 86 of the end plate 70, even if the plate connection member 130 is connected to the end plate 70, it is possible to eliminate or reduce the situation where the plate connection member 130 protrudes to the outside of the stack case 60 in the stacking direction (indicated by the arrow B).

Further, in the plate connection member 130, it is adequate that the opening side end 132 connected to at least the first opening 96 has a size which can cover the first opening 96. That is, the width of the opening side end 132 in the stacking direction (indicated by the arrow B) can be reduced up to the thickness of the end plate 70. Also in this respect, it is possible to easily avoid the situation where the plate connection member 130 protrudes to the outside of the stack case 60 in the stacking direction.

As a result, even in the case of adopting structure where the plate connection member 130 which connects the inside of the stack case 60 to the exhaust duct 13 for guiding the leaked fuel gas to the predetermined position such as the outside of the fuel cell vehicle 10v is connectable to the end plate 70, in particular, it is possible to suppress increase in the size of the fuel cell system 10 in the stacking direction.

In the fuel cell system 10 according to the above embodiment, both ends of the plate connection member 130 in the stacking direction (left/right direction indicated by the arrow B) of, the end (the opening side end 132) of the plate connection member 130, at least connected to the first opening 96 are provided within the range of the thickness of the end plate 70. As described above, the width of the opening side end 132 in the stacking direction is determined to be within the range of the thickness of the end plate 70 to achieve reduction in the width of the plate connection member 130. In this manner, it becomes possible to effectively suppress increase in the size of the fuel cell system 10 in the stacking direction. The width of the opening side end 132 in the stacking direction may exceed the thickness of the end plate 70 as long as the opening side end 132 does not protrude significantly to the outside of the fuel cell system 10 in the stacking direction. The first extension 134 and the flange 142 may exceed the thinness of the end plate 70 as well.

In the fuel cell system 10 according to the above embodiment, the first opening 96 is provided in the upper surface 92 of the end plate 70. Since hydrogen as the fuel gas has low mass, the hydrogen tends to move upward (in the direction indicated by the arrow CU) in the vertical direction. Therefore, by providing the first opening 96 in the upper surface 92 of the end plate 70, it becomes possible to guide the hydrogen leaked into the stack case 60 to the exhaust duct 13 (first pipe 140) efficiently.

It should be noted that the first opening 96 may be provided in one of, or both of upper parts of the side surfaces 94a, 94b, instead of the upper surface 92 of the end plate 70.

It should be noted that the first opening 96 may be provided in all of the upper surface 92 and the side surfaces 94a, 94b of the end plate 70, and may be provided selectively in any one of, or more than one of the upper surface 92 and the side surfaces 94a, 94b of the end plate 70. In view of making it easier to discharge the fuel gas having low mass, it is preferable to provide the first opening 96 in the upper part of the outer peripheral end surface 88 in the vertical direction.

In the above embodiment, the second exhaust gas opening 129b is provided in the upper wall 120 of the peripheral wall case 68. Alternatively, the second exhaust gas opening 129b may be provided in a side wall 180 (FIG. 1) of the peripheral case 68 or the rear panel 74 (FIG. 3). Further, the second exhaust gas opening 129b may not be provided in the peripheral wall case 68. In this case, the first exhaust gas port may be provided in the upper surface 92, the side surfaces 94a, 94b, at both ends of the end plate 70 in the longitudinal direction.

The present invention is not limited to the above described embodiment. It is a matter of course that various modifications may be made without departing from the gist of the present invention.

For example, in the above embodiment, the fuel cell system 10 is mounted in the fuel cell vehicle 10v in a manner that the stacking direction of the stack body 20 is oriented in the left/right direction of the fuel cell vehicle 10v. However, the present invention is not limited specially in this respect. The stacking direction of the stack body 20 may be oriented in any direction such as the front/rear direction of the fuel cell vehicle 10v and the upper/lower direction of the fuel cell vehicle 10v. Further, in the above embodiment, the auxiliary device case 64 is provided at the left end of the stack case 60. Alternatively, the auxiliary device case 64 may be provided at the right end of the stack case 60. The third exhaust gas opening 129c may be provided in the inclined portion 64k1 of the first case member 104.

The above embodiment is summarized as follows:

The above embodiment discloses the fuel cell stack (11) mounted in the vehicle (10v), the fuel cell stack including the stack body (20) including the plurality of power generation cells (18) stacked together, the stack case (60) configured to store the stack body, and the auxiliary device case (64) adjacent to, and joined to the stack case in the horizontal direction, the auxiliary device case being configured to store the fuel cell auxiliary device, a tightening load being applied to the stack body by one of the end plates disposed at one end of the stack case and the other of the end plates disposed at the other end of the stack case, wherein the two exhaust gas openings (129a, 129b) are provided in the upper part of the stack case, the one exhaust gas opening (129c) is provided in the upper part of the auxiliary device case, and the exhaust duct (13) is connected to the only three exhaust gas openings in total.

The one exhaust gas opening (129c) may be provided in the upper part of the inclined portion (64k) forming the upper surface of the auxiliary device case.

The upper part of the auxiliary device case may include the plurality of inclined portions (64k) forming the upward ridge shape, and the one exhaust gas opening may be provided at the peak where the plurality of inclined portions are concentrated.

The two exhaust gas openings (129a, 129b) may be provided in a portion of the stack case close to the other (70) of the end plates.

The connection hole (116) configured to connect internal space of the stack case and internal space of the auxiliary device case may be provided in the one (112) of the end plates.

The other of the end plates may have an inner main surface (86) provided at one end in a thickness direction, adjacent to the inside of the stack case, the other of the end plates may have the first opening (96) as the one exhaust gas opening opened to the upper part of an outer peripheral end surface of the other of the end plates and the second opening (98) opened to the inner main surface in the upper part of the other of the end plates, and the connection channel (100) configured to connect the first opening and the second opening may be provided inside the other of the end plates, and the inside of the stack case and the exhaust duct (13) may be connected together through the plate connection member (130) connected to the first opening.

Further, the above embodiment discloses the fuel cell stack (11), the fuel cell stack including the stack body (20) including the plurality of power generation cells (18) stacked together, the stack case (60) configured to store the stack body, and the auxiliary device case (64) adjacent to, and joined to the stack case in the horizontal direction, the auxiliary device case being configured to store the fuel cell auxiliary device, the tightening load being applied to the stack body by one (112) of the end plates disposed at one end of the stack case and the other (70) of the end plates disposed at the other end of the stack case, wherein the upper part of the auxiliary device case includes a plurality of inclined portions (64k) forming an upward ridge shape, and the exhaust gas opening (129c) is provided at the peak where the plurality of inclined portions are concentrated.

The exhaust gas opening may be opened obliquely upward opposite to the one of the end plates.

The auxiliary device case may include the first case member (104) disposed close to the stack case, and the second case member (106) joined to the first case member on a side opposite to the stack case, and the exhaust gas opening may be provided in the second case member.

What is claimed is:

1. A fuel cell stack mounted in a vehicle, the fuel cell stack comprising:
    a stack body including a plurality of power generation cells stacked together;
    a stack case configured to store the stack body; and
    an auxiliary device case adjacent to, and joined to the stack case in a horizontal direction, the auxiliary device case being configured to store a fuel cell auxiliary device, a tightening load being applied to the stack body by a first end plate disposed at a first end of the stack case and a second end plate disposed at a second end of the stack case,
    wherein a first exhaust gas opening and a second exhaust gas opening are provided in an upper part of the stack case;
    a third exhaust gas opening is provided in an upper part of the auxiliary device case;
    an exhaust duct is connected to the first exhaust gas opening, the second exhaust gas opening, the third exhaust gas opening, and one or more exhaust gas ports;
    no exhaust gas opening other than the first exhaust gas opening, the second exhaust gas opening, the third exhaust gas opening, and the one or more exhaust gas ports is connected to the exhaust duct,
    at the second end of the stack case, the first exhaust gas opening is opened in a rear portion of the stack case in a front and rear direction of the vehicle,
    at the second end of the stack case, the second exhaust gas opening is opened in a front portion of the stack case in the front and rear direction of the vehicle, and
    in the front and rear direction of the vehicle, the third exhaust gas opening is opened at a position between the first exhaust gas opening and the second exhaust gas opening.

2. The fuel cell stack according to claim 1, wherein the third exhaust gas opening is provided in an upper part of an inclined portion forming an upper surface of the auxiliary device case.

3. The fuel cell stack according to claim 1, wherein a connection hole configured to connect internal space of the stack case and internal space of the auxiliary device case is provided in the first end plate.

4. A fuel cell stack mounted in a vehicle, the fuel cell stack comprising:
    a stack body including a plurality of power generation cells stacked together;
    a stack case configured to store the stack body; and
    an auxiliary device case adjacent to, and joined to the stack case in a horizontal direction, the auxiliary device case being configured to store a fuel cell auxiliary device, a tightening load being applied to the stack body by a first end plate disposed at a first end of the stack case and a second end plate disposed at a second end of the stack case,
    wherein a first exhaust gas opening and a second exhaust gas opening are provided in an upper part of the stack case;

a third gas exhaust gas opening is provided in an upper part of the auxiliary device case, wherein an upper part of the auxiliary device case includes a plurality of inclined portions forming an upward ridge shape; and the third exhaust gas opening is provided at a peak where the plurality of inclined portions are concentrated.

5. A fuel cell stack mounted in a vehicle, the fuel cell stack comprising:

a stack body including a plurality of power generation cells stacked together;

a stack case configured to store the stack body; and an auxiliary device case adjacent to, and joined to the stack case in a horizontal direction, the auxiliary device case being configured to store a fuel cell auxiliary device, a tightening load being applied to the stack body by a first end plate disposed at a first end of the stack case and a second end plate disposed at a second end of the stack case, wherein a first exhaust gas opening and a second exhaust gas opening are provided in an upper part of the stack case;

a third gas exhaust gas opening is provided in an upper part of the auxiliary device case, wherein the second end plate has an inner main surface provided at one end in a thickness direction, adjacent to inside of the stack case;

the second end plate has a first opening as the first exhaust gas opening opened to an upper part of an outer peripheral end surface of the second end plate and a second opening opened to the inner main surface in an upper part of the second end plate;

a connection channel configured to connect the first opening and the second opening is provided inside the second end plate; and the inside of the stack case and the exhaust duct are connected together through a plate connection member connected to the first opening.

6. A fuel cell stack comprising:

a stack body including a plurality of power generation cells stacked together;

a stack case configured to store the stack body; and an auxiliary device case adjacent to, and joined to the stack case in a horizontal direction, the auxiliary device case being configured to store a fuel cell auxiliary device, a tightening load being applied to the stack body by one of end plates disposed at one end of the stack case and another of end plates disposed at another end of the stack case, wherein an upper part of the auxiliary device case includes a plurality of inclined portions forming an upward ridge shape; and an exhaust gas opening is provided at a peak where the plurality of inclined portions are concentrated.

7. The fuel cell stack according to claim 6, wherein the exhaust gas opening is opened obliquely upward opposite to the one of the end plates.

8. The fuel cell stack according to claim 6, wherein the auxiliary device case includes a first case member disposed close to the stack case, and a second case member joined to the first case member on a side opposite to the stack case; and the exhaust gas opening is provided in the second case member.

* * * * *